(12) United States Patent
Narimatsu et al.

(10) Patent No.: US 9,250,507 B2
(45) Date of Patent: Feb. 2, 2016

(54) PROJECTOR

(71) Applicant: Seiko Epson Corporation, Tokyo (JP)

(72) Inventors: Shuji Narimatsu, Suwa (JP); Akitaka Yajima, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 158 days.

(21) Appl. No.: 13/955,114

(22) Filed: Jul. 31, 2013

(65) Prior Publication Data

US 2014/0036164 A1 Feb. 6, 2014

(30) Foreign Application Priority Data

Aug. 3, 2012 (JP) .................................. 2012-172612

(51) Int. Cl.
| | |
|---|---|
| *G03B 33/12* | (2006.01) |
| *H04N 9/31* | (2006.01) |
| *G03B 21/20* | (2006.01) |
| *G02F 1/13* | (2006.01) |
| *G09G 3/00* | (2006.01) |

(52) U.S. Cl.
CPC .......... *G03B 21/2053* (2013.01); *G02F 1/1313* (2013.01); *G03B 21/2033* (2013.01); *G03B 33/12* (2013.01); *G09G 3/001* (2013.01); *H04N 9/3111* (2013.01); *H04N 9/3164* (2013.01); *G09G 2340/0457* (2013.01); *H04N 9/3105* (2013.01)

(58) Field of Classification Search
CPC .... G03B 21/008; G03B 21/006; G03B 33/12; H04N 9/3105; H04N 9/3114; H04N 9/3167
See application file for complete search history.

(56) References Cited

U.S. PATENT DOCUMENTS

| | | | |
|---|---|---|---|
| 2005/0185139 A1* | 8/2005 | Yamanaka et al. | 353/20 |
| 2013/0188149 A1* | 7/2013 | Decusatis | 353/8 |

FOREIGN PATENT DOCUMENTS

| | | |
|---|---|---|
| JP | 2001-42431 A | 2/1920 |
| JP | 2000-180823 A | 6/2000 |
| JP | 2008-20707 A | 1/2008 |

* cited by examiner

*Primary Examiner* — William C Dowling
*Assistant Examiner* — Ryan Howard
(74) *Attorney, Agent, or Firm* — ALG Intellectual Property, LLC (57) ABSTRACT

Two light modulators, a first light modulator and a second light modulator, suffice for four light sources, a first light source, a second light source, a third light source, and a fourth light source, whereby the cost can be lowered as compared with a configuration in which three light modulators are required. As a result, cost reduction is achieved. Further, since two light modulators suffice, the size of the projector can be reduced as compared with the configuration in which three light modulators are required.

6 Claims, 8 Drawing Sheets

PROJECTOR

The entire disclosure of Japanese Patent Application No. 2012-172612, filed Aug. 3, 2012 is expressly incorporated by reference herein.

BACKGROUND

1. Technical Field

The present invention relates to a projector.

2. Related Art

There is a known projector that modulates light having exited out of a light source unit in accordance with image information by using a light modulator and enlarges and projects the resultant image by using a projection lens. As a known configuration of a projector of this type, a light modulator is disposed, for example, for each of red light, green light, and blue light, and modulated light fluxes are combined with each other. JP-A-2001-42431 is exemplified as a related art document.

In the configuration described above, however, the need to provide three light modulators causes an increase in cost.

SUMMARY

An advantage of some aspects of the invention is to provide a projector that can achieve cost reduction.

A projector according to an aspect of the invention includes a first light source that emits first light, a second light source that emits second light having a wavelength shorter than the wavelength of the first light, a first light modulator that modulates the first light and the second light and outputs the modulated light fluxes as first polarized light, a third light source that emits third light having a wavelength shorter than the wavelength of the first light, a fourth light source that emits fourth light having a wavelength shorter than the wavelength of the third light, a second light modulator that modulates the third light and the fourth light and outputs the modulated light fluxes as second polarized light, a combiner capable of combining the first light, the second light, the third light, and the fourth light by directing the first light and the second light having exited out of the first light modulator in a predetermined direction based on one of transmission and reflection and directing the third light and the fourth light having exited out of the second light modulator in the predetermined direction based on the other one of transmission and reflection different from the one of transmission and reflection, and a controller that drives the first light source and the third light source to emit the first light and the third light in a first period, drives the second light source and the fourth light source to emit the second light and the fourth light in a second period following the first period, controls the first light modulator to perform modulation corresponding to the first light in the first period and modulation corresponding to the second light in the second period, and controls the second light modulator to perform modulation corresponding to the third light in the first period and modulation corresponding to the fourth light in the second period.

According to the aspect of the invention, among the four light sources, the first light from the first light source and the second light from the second light source can be modulated by using the first light modulator separately in the first period and the second period, and the third light from the third light source and the fourth light from the fourth light source can be modulated by using the second light modulator separately in the first period and the second period, whereby only the two light modulators, the first light modulator and the second light modulator, suffice. As a result, the cost can be lowered as compared with a configuration in which three light modulators are required, whereby cost reduction is achieved. Further, since only the two light modulators suffice, the size of the projector can be reduced as compared with a configuration in which three light modulators are required.

In the projector described above, it is preferable that the first light is red light, the second light and the third light are green light, and the fourth light is blue light.

According to this configuration, since only two light modulators need to modulate the three color light fluxes, the red light, the green light, and the blue light, the cost can be lowered as compared with a configuration in which three light modulators are required.

In the projector described above, it is preferable that each of the first light source, the second light source, the third light source, and the fourth light source is a light emitting diode, and that the controller drives the first light source, the second light source, the third light source, and the fourth light source to emit light by supplying each of the first light source, the second light source, the third light source, and the fourth light source with a pulse voltage in the first period or the second period.

According to this configuration, since an instantly large amount of current can flow through the light emitting diodes used as the first light source, the second light source, the third light source, and the fourth light source, a large amount of light emission is provided, whereby the projector excels in luminance.

In the projector described above, it is preferable that the first light modulator and the second light modulator modulate the first light, the second light, the third light, and the fourth light in such a way that an image formed by each of the first light, the second light, the third light, and the fourth light has a plurality of pixels arranged in a matrix, and that the first light modulator and the second light modulator are so disposed that the images formed by the first light and the second light modulated by the first light modulator and the images formed by the third light and the fourth light modulated by the second light modulator are combined with each other with the plurality of pixels contained in the images formed by the first light and the second light shifted from the plurality of pixels contained in the images formed by the third light and the fourth light in row and column directions by one-half the pitch between the pixels.

According to this configuration, since the images formed by the light modulated by the first light modulator and the images formed by the light modulated by the second light modulator are combined with each other with the former images and the latter images shifted from each other in the row and column directions by one-half the pitch between the pixels that form the images, apparent resolution (pseudo resolution) can be improved.

In the projector described above, it is preferable that each of the first light modulator and the second light modulator is a liquid crystal device.

According to this configuration, since each of the first light modulator and the second light modulator is a liquid crystal device, the cost of the liquid crystal devices can be lowered as compared with a configuration in which three liquid crystal devices are required.

In the projector described above, it is preferable that one of the first polarized light and the second polarized light is P-polarized light and the other is S-polarized light.

According to this configuration, since one of the first polarized light and the second polarized light is P-polarized light and the other is S-polarized light, the light combination is efficiently performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings. The present embodiment shows one aspect of the invention and does not limit the scope of the invention. Each component according to the present embodiment can therefore be arbitrarily changed within the technical idea of the invention. Further, in the following drawings, the scale, the number, and other factors in each structure differ from those in the actual structure for ease of illustration.

Figure 1:
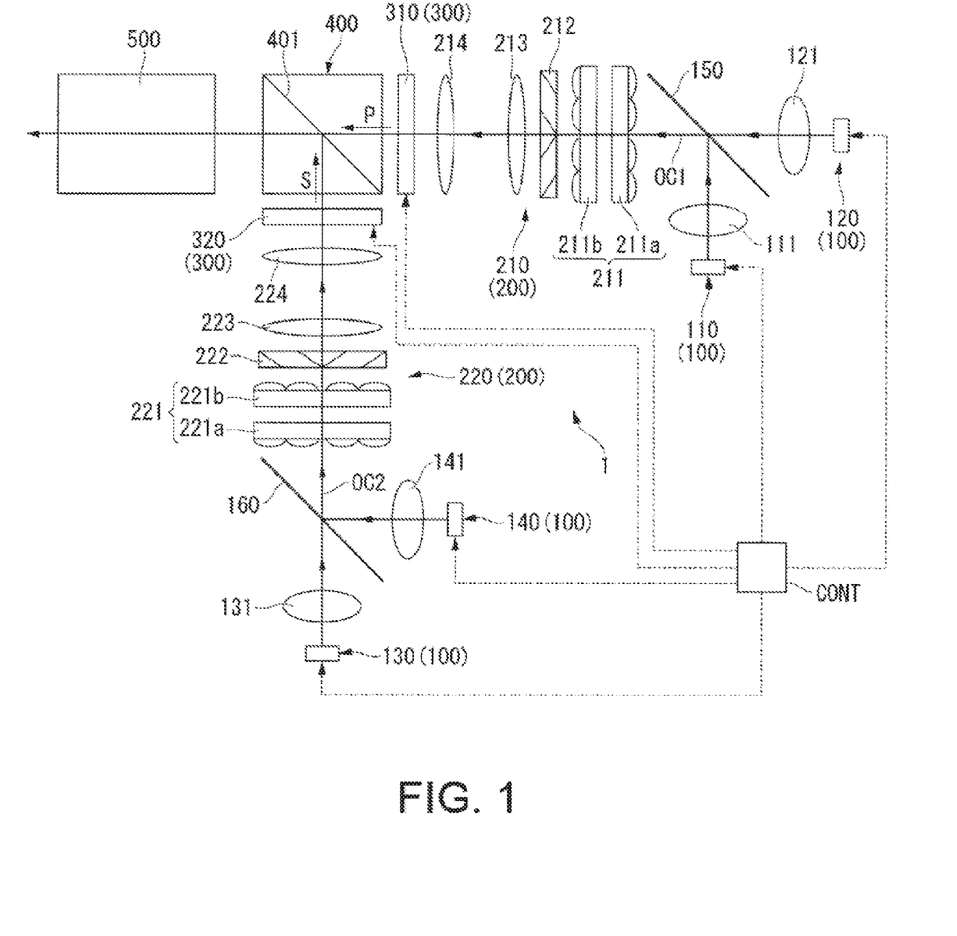
FIG. 1 shows the configuration of a projector according to an embodiment of the invention.

FIG. 1 shows a schematic configuration of a projector 1 according to an embodiment of the invention.

The projector 1 includes a light source unit 100, an illumination system 200, a light modulator 300, a light combiner 400, a projection lens 500, and a controller CONT, as shown in FIG. 1.

The light source unit 100 includes the following four light sources: a first light source 110; a second light source 120; a third light source 130; and a fourth light source 140. Each of the first light source 110, the second light source 120, the third light source 130, and the fourth light source 140 is a light emitting diode.

The first light source 110 emits, for example, red light as first light. The second light source 120 emits, for example, green light as second light. The third light source 130 emits, for example, green light as third light. The fourth light source 140 emits, for example, blue light as fourth light. In this case, the wavelengths of the second light and the third light are shorter than the wavelength of the first light, and the wavelength of the fourth light is shorter than the wavelength of the third light.

A pickup system 111 guides the red light emitted from the first light source 110 to a dichroic mirror 150. A pickup system 121 guides the green light emitted from the second light source 120 to the dichroic mirror 150. The dichroic mirror 150 reflects the red light emitted from the first light source 110 and transmits the green light emitted from the second light source 120.

A pickup system 131 guides the green light emitted from the third light source 130 to a dichroic mirror 160. A pickup system 141 guides the blue light emitted from the fourth light source 140 to the dichroic mirror 160. The dichroic mirror 160 transmits the green light emitted from the third light source 130 and reflects the blue light emitted from the fourth light source 140.

The illumination system 200 includes a first illumination system 210 and a second illumination system 220.

The first illumination system 210 is disposed in the optical path of the red light and the green light that travel via the dichroic mirror 150.

The first illumination system 210 includes a fly's eye integrator 211, a polarization conversion element 212, a parallelizing lens 213, and a collector lens 214. The fly's eye integrator 211 includes a first lens array 211a and a second lens array 211b. Each of the first lens array 211a and the second lens array 211b has a plurality of lenslets. The plurality of lenslets are arranged in a matrix in a plane perpendicular to an optical axis OC1 of the red light and the green light that travel via the dichroic mirror 150.

The polarization conversion element 212 converts randomly polarized light fluxes into polarized light fluxes having an aligned single polarization direction.

The parallelizing lens 213 parallelizes the red light and the green light having exited out of the polarization conversion element 212.

The collector lens 214 directs the parallelized red light and green light to the light modulator 300 (first light modulator 310).

The second illumination system 220 is disposed in the optical path of the green light and the blue light that travel via the dichroic mirror 160.

The second illumination system 220 includes a fly's eye integrator 221, a polarization conversion element 222, a parallelizing lens 223, and a collector lens 224, as the first illumination system 210 does. The fly's eye integrator 221 includes a first lens array 221a and a second lens array 221b. Each of the first lens array 221a and the second lens array 221b has a plurality of lenslets. The plurality of lenslets are arranged in a matrix in a plane perpendicular to an optical axis OC2 of the green light and the blue light that travel via the dichroic mirror 160.

The polarization conversion element 222 converts randomly polarized light fluxes into polarized light fluxes having an aligned single polarization direction.

The parallelizing lens 223 parallelizes the green light and the blue light having exited out of the polarization conversion element 222.

The collector lens 224 directs the parallelized green light and blue light to the light modulator 300 (second light modulator 320).

The light modulator 300 includes a first light modulator 310 and a second light modulator 320. The first light modulator 310 modulates the red light and the green light having exited out of the collector lens 214 and outputs the modulated light fluxes as first polarized light (P-polarized light). The second light modulator 320 modulates the green light and the blue light having exited out of the collector lens 224 and outputs the modulated light fluxes as second polarized light (S-polarized light).

Each of the first light modulator 310 and the second light modulator 320 can, for example, be a liquid crystal device. The liquid crystal device may be of transmissive type or reflective type. Each of the first light modulator 310 and the second light modulator 320 may alternatively be a DMD or any other similar light modulation device.

Each of the first light modulator 310 and the second light modulator 320 has, for example, a configuration in which a plurality of pixels are arranged in a matrix. Provided that the modulated light fluxes from the first light modulator 310 and the second light modulator 320 are projected through the projection lens 500 on a screen or any other surface, the first light modulator 310 and the second light modulator 320 are so disposed that the pixels that form one of the projected images are overlaid on the pixels that form the other projected image.

The light combiner 400 combines the light fluxes modulated by the first light modulator 310 and the second light modulator 320 with each other. The light combiner 400 has a dichroic layer 401. The dichroic layer 401 is characterized in that the light transmittance (or reflectance) characteristic thereof changes in accordance with the polarization direction (P-polarized light, S-polarized light) and the wavelength of the light incident on the dichroic layer 401.

Figure 2:
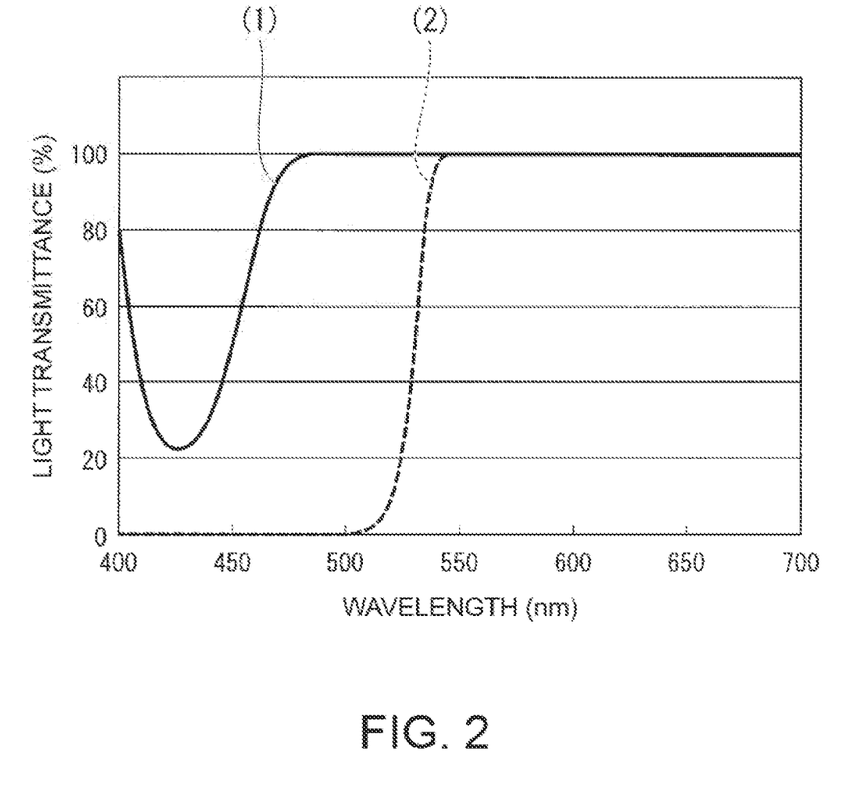
FIG. 2 shows graphs illustrating the light transmittance of a dichroic layer according to the present embodiment.

FIG. 2 shows graphs illustrating an example of the light transmittance characteristic of the dichroic layer 401.

The vertical axis in FIG. 2 represents the light transmittance (%), and the horizontal axis in FIG. 2 represents the wavelength (nm) of light. A graph (1) shows the characteristic for P-polarized light, and a graph (2) shows the characteristic for S-polarized light.

The dichroic layer 401 transmits P-polarized light having wavelengths, for example, longer than or equal to 480 nm at a light transmittance of nearly 100%, as indicated by the graph (1) in FIG. 2. Therefore, when the dichroic layer 401 is irradiated with P-polarized light having wavelengths longer than or equal to 480 nm, the P-polarized light passes through the dichroic layer 401.

Further, the dichroic layer 401 transmits S-polarized light having wavelengths longer than or equal to 540 nm at a light transmittance of nearly 100%, as indicated by the graph (2) in FIG. 2. As described above, the light transmittance characteristic of the dichroic layer 401 is so shaped that the graph (2) illustrating the light transmittance for S-polarized light is shifted from the graph (1) illustrating the light transmittance for P-polarized light toward longer wavelengths.

Further, the light transmittance of the dichroic layer 401 for S-polarized light decreases as the wavelength thereof becomes shorter than 540 nm and shows about 0% for S-polarized light having wavelengths, for example, shorter than or equal to 530 nm, as indicated by the graph (2) in FIG. 2. Therefore, light having wavelengths, for example, longer than or equal to 480 nm but shorter than or equal to 530 nm passes through the dichroic layer 401 when the light is P-polarized light, whereas the light is reflected off the dichroic layer 401 when the light is S-polarized light.

According to the characteristic of the dichroic layer 401 described above, light having wavelengths longer than 480 nm can be used as the red light emitted from the first light source 110 and the green light emitted from the second light source 120. The thus set red light and green light having exited out of the first light modulator 310 as P-polarized light pass through the dichroic layer 401.

Further, light having wavelengths longer than or equal to 480 nm but shorter than or equal to 540 nm can be used as the green light emitted from the third light source 130, and light having wavelengths shorter than or equal to 540 nm can be used as the blue light emitted from the fourth light source 140. The thus set green light and blue light having exited out of the second light modulator 320 as S-polarized light are reflected off the dichroic layer 401. The second light source 120 and the third light source 130 may be light emitting diodes that emit light fluxes in the same wavelength region or light emitting diodes that emit light fluxes in different wavelength regions.

When light emitting diodes that emit light fluxes in the same wavelength region are used as the second light source 120 and the third light source 130, the light emitting diodes may be those that emit light having wavelengths longer than or equal to 480 nm but shorter than or equal to 540 nm.

As described above, the light combiner 400 combines the transmitted light having passed through the dichroic layer 401 (P-polarized red light and green light) and the reflected light having been reflected off the dichroic layer 401 (S-polarized green light and blue light) with each other and outputs the combined light as image light. In this process, since the transmitted light (red light and green light) is P-polarized light and the reflected light (green light and blue light) is S-polarized light, the light combination is efficiently performed.

The projection lens 500 enlarges and projects the image light having exited out of the light combiner 400 on a screen (not shown).

The controller CONT oversees and controls the components described above.

The action of the thus configured projector 1 will next be described.

Figure 3:
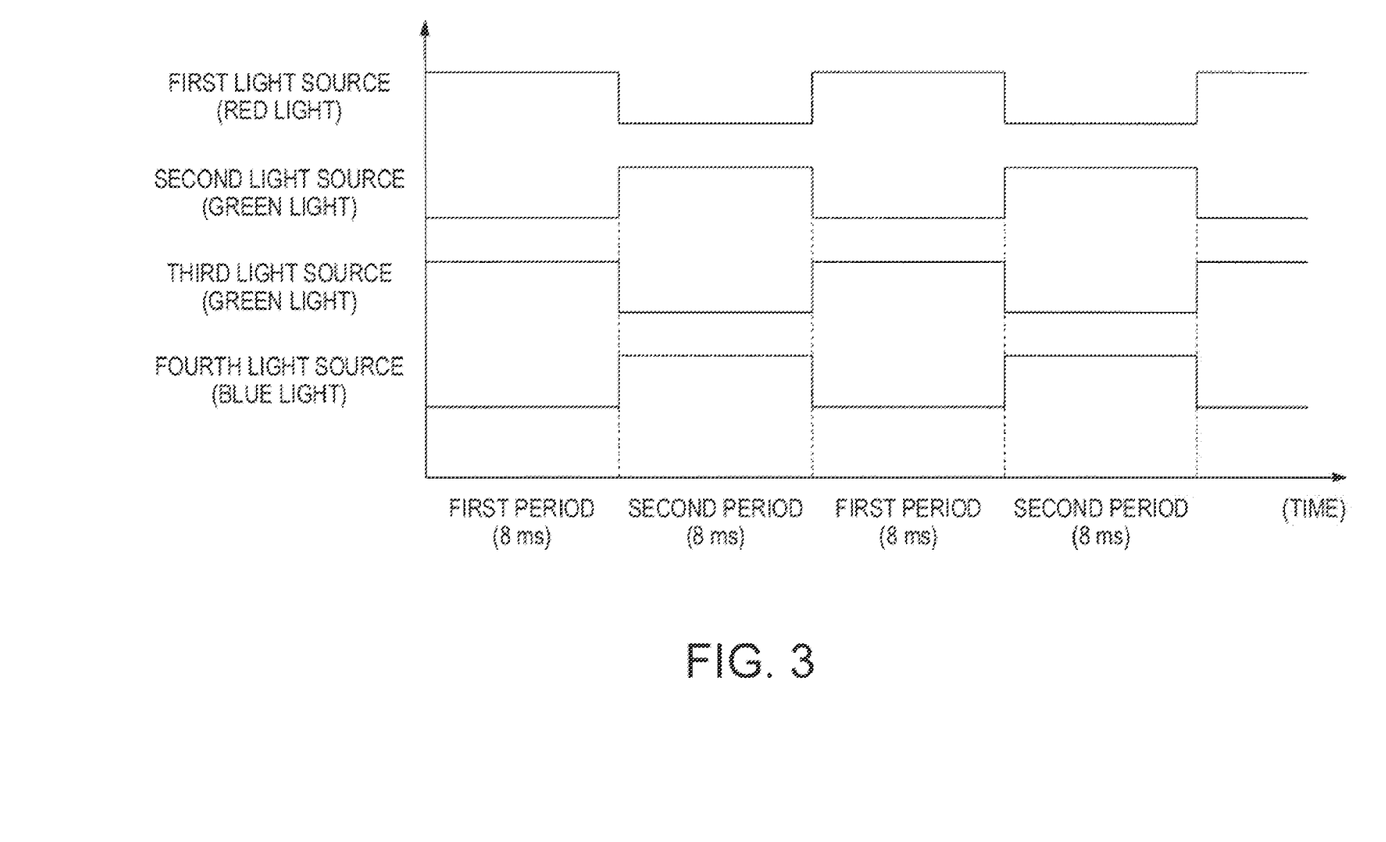
FIG. 3 is a time chart showing the action of the projector according to the present embodiment.

The action of the light source unit 100 will first be described. FIG. 3 is a time chart showing the action of the light source unit 100. The vertical axis of the time chart represents voltage values (relative values) applied to the first light source 110, the second light source 120, the third light source 130, and the fourth light source 140. The horizontal axis of the time chart represents elapsed time.

The controller CONT supplies the first light source 110 and the third light source 130 with pulse voltage from the start of action of the light source unit 100 for a first period (8 ms, for example) to cause the first light source 110 and the third light source 130 to emit light, as shown in FIG. 3. The action of the controller CONT causes the first light source 110 to emit red light and the third light source 130 to emit green light. In this action, since instantly large current flows through the first light source 110 and the third light source 130, a large amount of light emission is produced. After the first period ends, the first light source 110 and the third light source 130 stop emitting light.

Thereafter, the controller CONT supplies the second light source 120 and the fourth light source 140 with pulse voltage for a second period (8 ms, for example) continuously following the first period to cause the second light source 120 and the fourth light source 140 to emit light. The action of the controller CONT causes the second light source 120 to emit green light and the fourth light source 140 to emit blue light. In this action, since instantly large current flows through the second light source 120 and the fourth light source 140, a large amount of light emission is produced. After the second period ends, the second light source 120 and the fourth light source 140 stop emitting light.

When the controller CONT continuously repeats the action described above, the period during which the first light source 110 emits the red light and the third light source 130 emits the green light (first period) and the period during which the second light source 120 emits the green light and the fourth light source 140 emits the blue light (second period) are alternately repeated.

Figure 4:
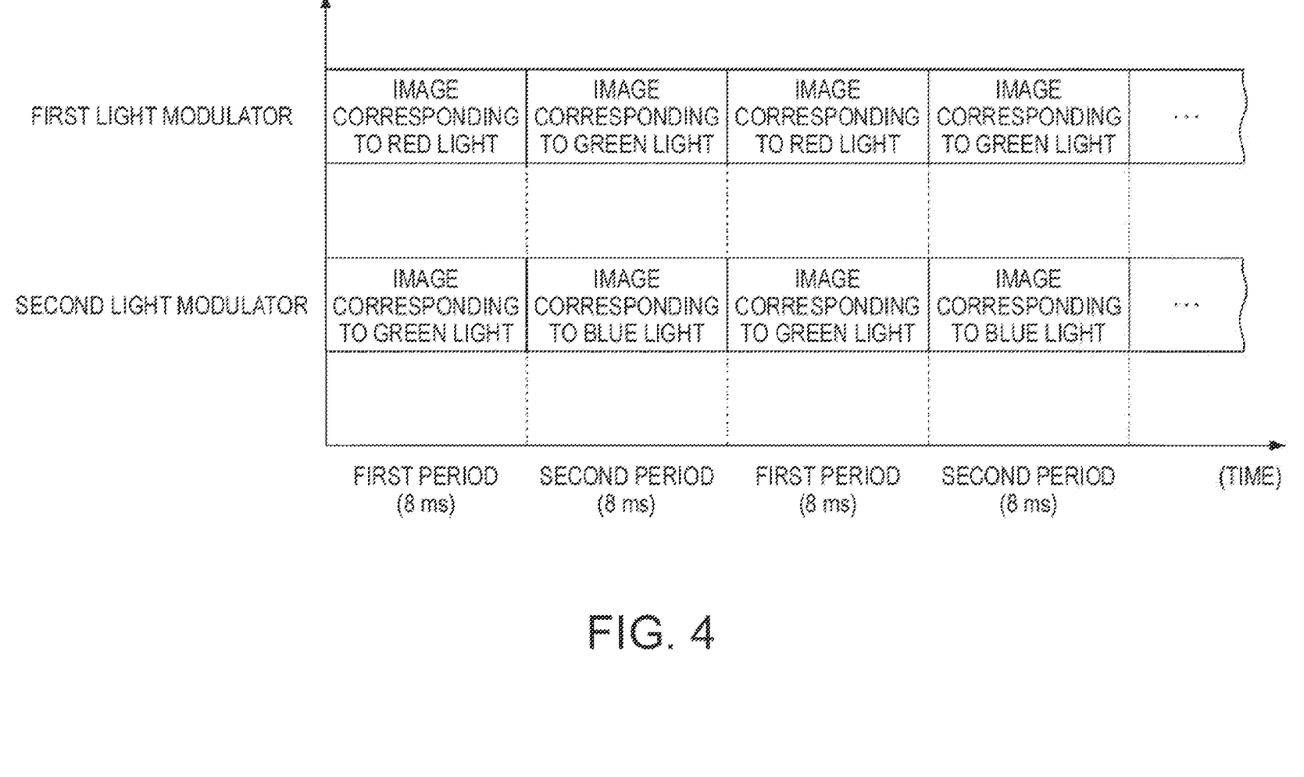
FIG. 4 is a time chart showing the action of the projector according to the present embodiment.

The action of the light modulator 300 will next be described. FIG. 4 is a time chart showing the action of the first light modulator 310 and the second light modulator 320.

In the first period described above, the first light modulator 310 is irradiated with the red light emitted from the first light source 110. The controller CONT therefore inputs an image signal corresponding to the red light to the first light modulator 310 in the first period, as shown in FIG. 4. In response to the action of the controller CONT, modulation corresponding to the red light is performed.

Further, in the first period described above, the second light modulator 320 is irradiated with the green light emitted from the third light source 130. The controller CONT therefore inputs an image signal corresponding to the green light to the second light modulator 320 in the first period, as shown in FIG. 4. In response to the action of the controller CONT, modulation corresponding to the green light is performed.

On the other hand, in the second period described above, the first light modulator 310 is irradiated with the green light emitted from the second light source 120. The controller CONT therefore inputs an image signal corresponding to the green light to the first light modulator 310 in the second period, as shown in FIG. 4. In response to the action of the controller CONT, modulation corresponding to the green light is performed.

Further, in the second period described above, the second light modulator 320 is irradiated with the blue light emitted from the fourth light source 140. The controller CONT therefore inputs an image signal corresponding to the blue light to the second light modulator 320 in the second period, as shown in FIG. 4. In response to the action of the controller CONT, modulation corresponding to the blue light is performed.

Figure 5:
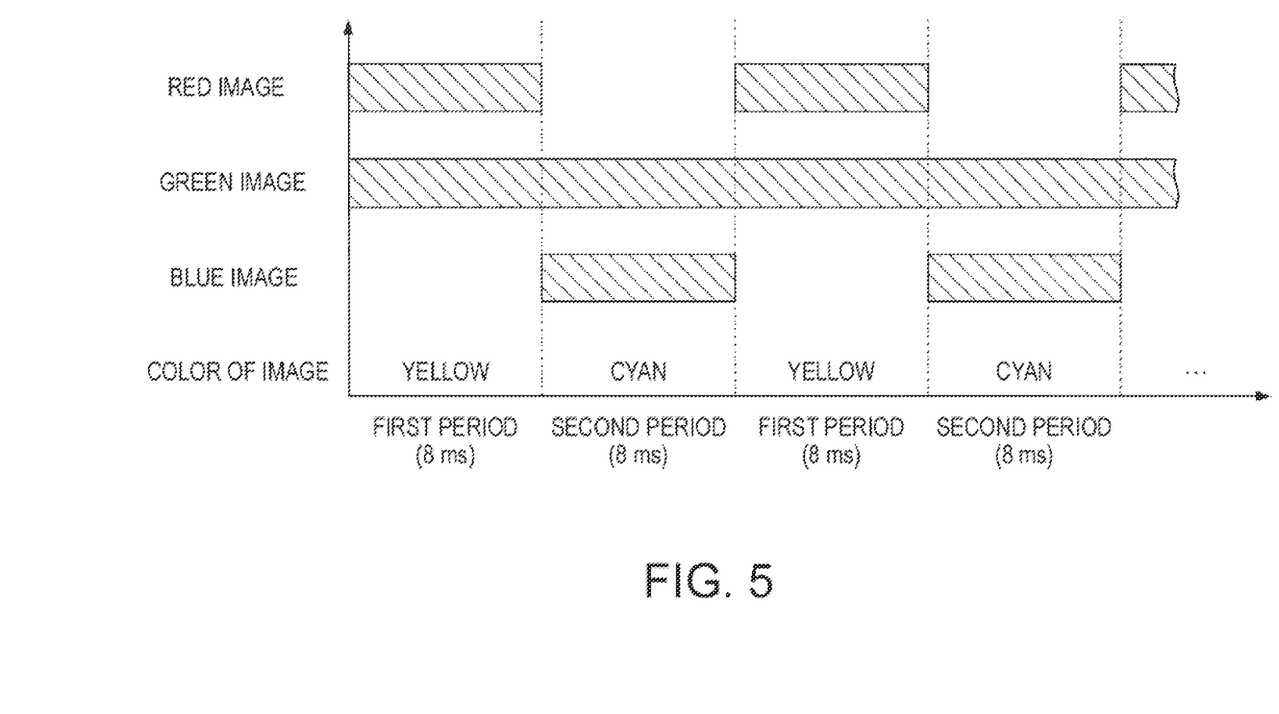
FIG. 5 is a time chart showing the action of the projector according to the present embodiment.

FIG. 5 is a time chart showing changes in images combined in the light combiner 400 and changes in an image projected on the screen.

As a result of the action described above, in the first period, the P-polarized red light modulated by the first light modulator 310 and the S-polarized green light modulated by the second light modulator 320 are incident on the light combining unit 400. In the light combiner 400, the P-polarized red light passes through the dichroic layer 401, and the S-polarized green light is reflected off the dichroic layer 401.

The image projected on the screen through the projection lens 500 in the first period is therefore an image formed by the P-polarized red light (red image) and an image formed by the S-polarized green light (green image), as shown in FIG. 5. The combination of the red image and the green image is projected, for example, as a yellow image on the screen.

Further, as a result of the action described above, in the second period, the P-polarized green light modulated by the first light modulator 310 and the S-polarized blue light modulated by the second light modulator 320 are incident on the light combiner 400. In the light combiner 400, the P-polarized green light passes through the dichroic layer 401, and the S-polarized blue light is reflected off the dichroic layer 401.

The image projected on the screen through the projection lens 500 in the second period is therefore an image formed by the P-polarized green light (green image) and an image formed by the S-polarized blue light (blue image), as shown in FIG. 5. The combination of the green image and the blue image is projected, for example, as a cyan image on the screen.

As described above, according to the present embodiment, among the four light sources, the red light from the first light source 110 and the green light from the second light source 120 can be modulated by using the first light modulator 310 separately in the first period and the second period, and the green light from the third light source 130 and the blue light from the fourth light source 140 can be modulated by using the second light modulator 320 separately in the first period and the second period, whereby only the two light modulators, the first light modulator 310 and the second light modulator 320, suffice. As a result, the cost can be lowered as compared with a configuration in which three light modulators are required, whereby cost reduction is achieved. Further, since only the two light modulators suffice, the size of the projector can be reduced as compared with a configuration in which three light modulators are required.

Further, according to the present embodiment, since each of the first light source 110, the second light source 120, the third light source 130, and the fourth light source 140 is a light emitting diode, and a pulse voltage is supplied to each of the first light source 110, the second light source 120, the third light source 130, and the fourth light source 140 to cause the light source to emit light, an instantly large amount of current can flow through the first light source 110, the second light source 120, the third light source 130, and the fourth light source 140. As a result, a large amount of light emission is provided, whereby the projector 1 excels in luminance.

For example, when light sources for the three colors, that is, a red light source, a green light source, and a blue light source, are disposed in each of two optical paths, satisfactory angle dependence is not achieved because each bandwidth is too wide, resulting in an insufficient amount of light provided on the projection lens side. In contrast, in the present embodiment, since the green light sources (second light source 120 and third light source 130) are disposed in the respective two optical paths and combined only with the red light source (first light source 110) in one of the optical paths and only with the blue light source (fourth light source 140) in the other optical path, light combining layer characteristics are readily provided.

The technical range of the invention is not limited to the embodiment described above, and changes can be made thereto as appropriate to the extent that the changes do not depart from the substance of the invention.

For example, the above embodiment has been described with reference to the case where the first light modulator 310 and the second light modulator 320 are so disposed that when modulated light fluxes therefrom are projected through the projection lens 500 on the screen or any other surface, the pixels that form one of the projected images are overlaid on the pixels that form the other projected image, but the invention is not necessarily configured this way.

Figure 6:
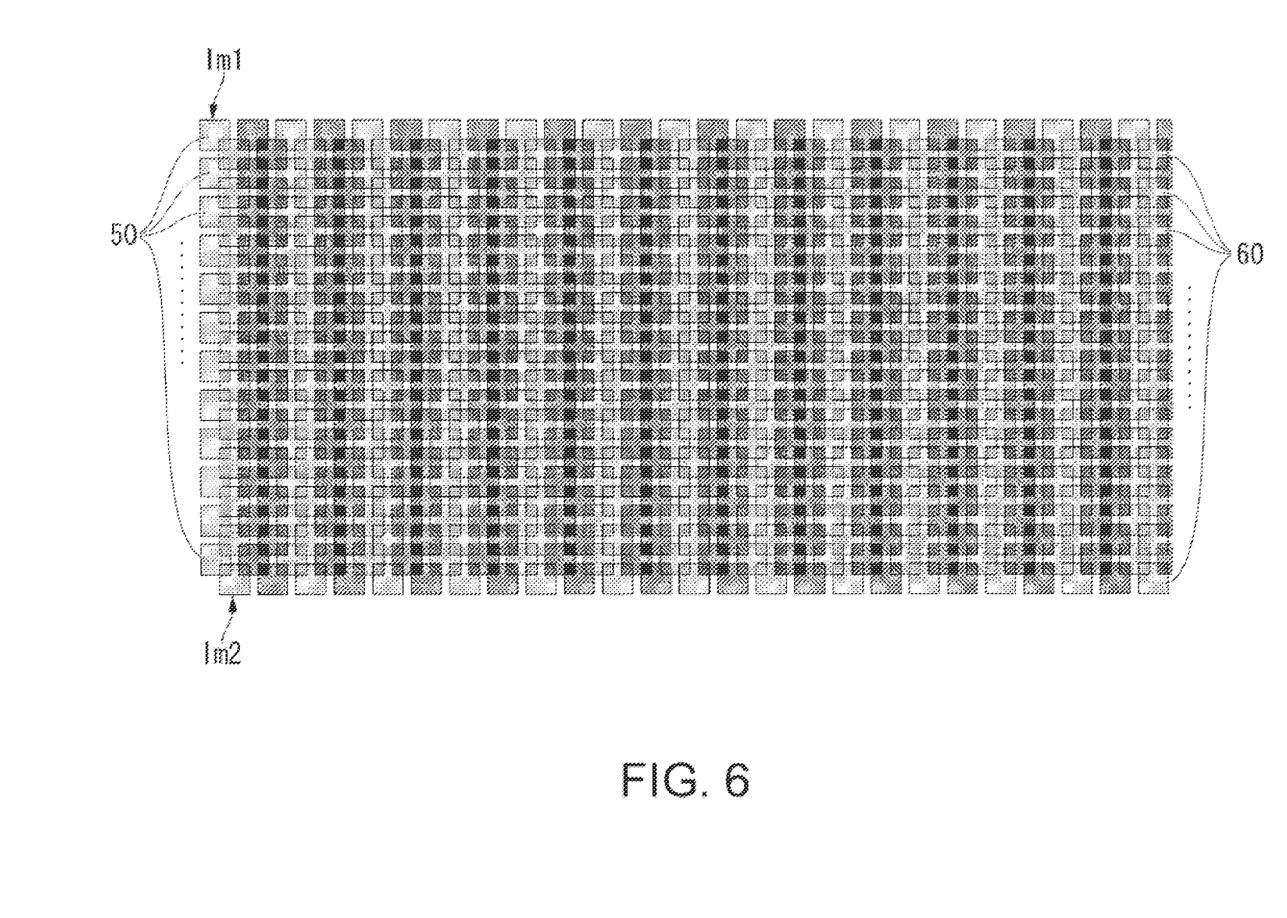
FIG. 6 shows a screen projection image according to a variation of the invention.

When modulated light fluxes from the first light modulator 310 and the second light modulator 320 are projected on the screen or any other surface, the first light modulator 310 and the second light modulator 320 may be so disposed that pixels 50 contained in an image 1 ml produced by the first light modulator 310 and pixels 60 contained in an image Im2 produced by the second light modulator 320 overlap with each other but shifted from each other in the row and column directions by one-half a pixel, as shown, for example, in FIG. 6. This configuration can improve apparent resolution (pseudo resolution).

Further, the above embodiment has been described with reference to the case where the light transmission characteristic of the dichroic layer 401 is so shaped that the light transmittance distribution for S-polarized light is shifted from the light transmittance distribution for P-polarized light toward longer wavelengths, but the invention is not necessarily configured this way.

Figure 7:
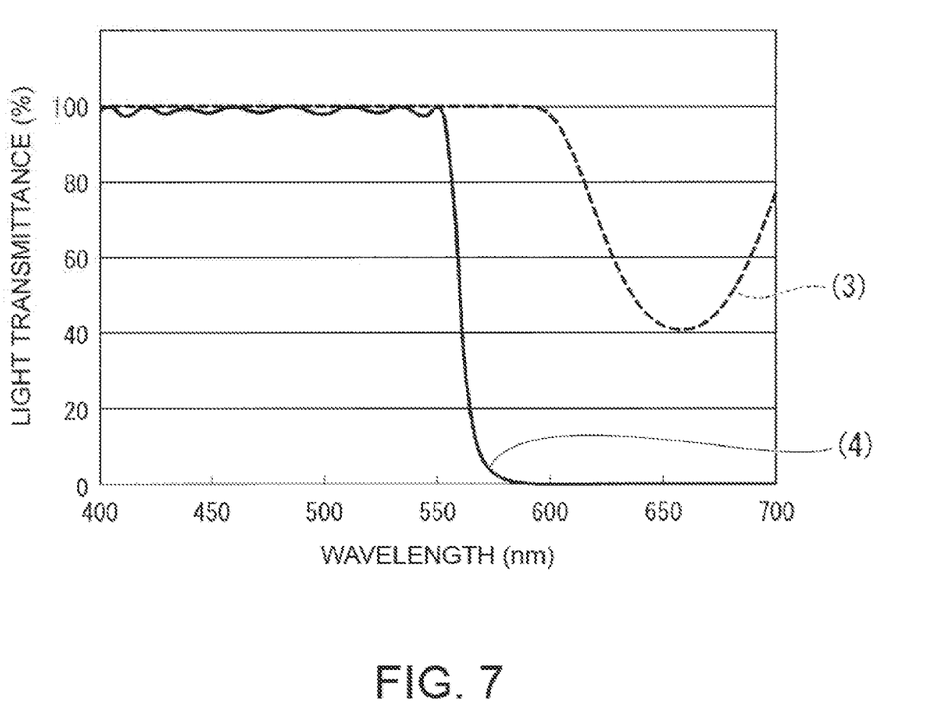
FIG. 7 shows graphs illustrating the light transmittance of a dichroic layer according to a variation of the invention.

FIG. 7 shows graphs illustrating an example of the light transmittance characteristic of the dichroic layer 401.

The vertical axis in FIG. 7 represents the light transmittance (%), and the horizontal axis in FIG. 7 represents the wavelength (nm) of light. A graph (3) shows the characteristic for P-polarized light, and a graph (4) shows the characteristic for S-polarized light.

The dichroic layer may have a light transmission characteristic so shaped that the light transmittance distribution for S-polarized light is shifted from the light transmittance distribution for P-polarized light toward shorter wavelengths, as shown in FIG. 7. It is noted, in general, that the light transmittance distribution for S-polarized light is shifted from the light transmittance distribution for P-polarized light in such a way that the light reflection band (band in which light transmittance is zero, for example) increases.

The dichroic layer having the characteristic shown in FIG. 7, for example, reflects S-polarized red light and transmits both P-polarized and S-polarized blue light. Further, the dichroic layer reflects S-polarized light having wavelengths longer than or equal to 550 nm but shorter than or equal to 600 nm (green light, for example).

In consideration of the characteristic described above, the embodiment described above can, for example, be reconfigured as follows: A light emitting diode that emits blue light is disposed as the fourth light source in the position where the first red light source 110 is disposed; a light emitting diode that emits green light is disposed as the third light source in the position where the second green light source 120 is disposed; a light emitting diode that emits green light is disposed as the second light source in the position where the third green light source 130 is disposed; and a light emitting diode that emits red light is disposed as the first light source in the position where the fourth blue light source 140 is disposed.

In this case, the red light from the first light source and the green light from the second light source are reflected off the dichroic layer having the characteristic shown in FIG. 7. Further, the green light from the third light source and the blue light from the fourth light source pass through the dichroic layer. In this case, light having wavelengths longer than or equal to 550 nm but shorter than or equal to 600 nm can be used as the green light from the second light source and the green light from the third light source.

In the above configuration, the second light modulator 320 in the embodiment described above modulates the red light and the green light and outputs the modulated light fluxes as first polarized light (S-polarized light), and the first light modulator 310 in the embodiment described above modulates the blue light and the green light and outputs the modulated light fluxes as second polarized light (P-polarized light).

When the light having been reflected off the dichroic layer and the light having passed through the dichroic layer are combined with each other, the light combination is efficiently performed because the reflected light (red light and green light) is S-polarized light and the transmitted light (green light and blue light) is P-polarized light.

Figure 8:
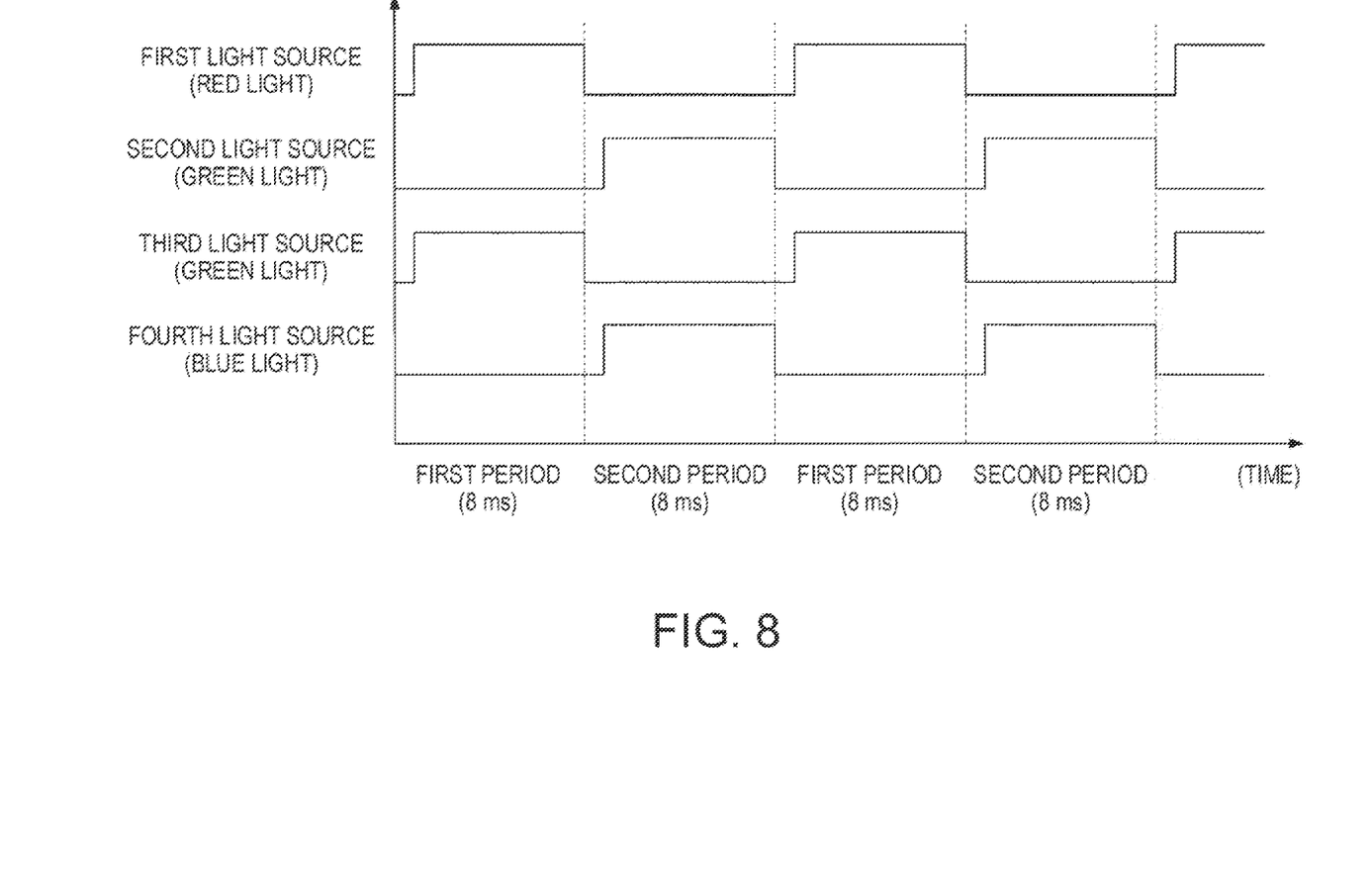
FIG. 8 is a time chart showing the action of a projector according to a variation of the invention.

Further, in the embodiment described above, the first light source 110 to the fourth light source 140 are driven to emit light in the entire first or second period, as shown, for example, in FIG. 3, but the invention is not necessarily configured this way. For example, the first light source 110 to the fourth light source 140 may be driven to emit light after a fixed period elapses from the start of the first and second periods, as shown in FIG. 8, in order to prevent color mixture.

What is claimed is:

1. A projector comprising:
a first light source that emits first light;
a second light source that emits second light having a wavelength shorter than the wavelength of the first light;
a first light modulator that modulates the first light and the second light and outputs the modulated light fluxes as first polarized light;
a third light source that emits third light having a wavelength shorter than the wavelength of the first light;
a fourth light source that emits fourth light having a wavelength shorter than the wavelength of the third light;
a second light modulator that modulates the third light and the fourth light and outputs the modulated light fluxes as second polarized light;
a combiner that combines the first light, the second light, the third light, and the fourth light by directing the first light and the second light having exited out of the first light modulator in a predetermined direction based on one of transmission and reflection and directing the third light and the fourth light having exited out of the second light modulator in the predetermined direction based on the other one of transmission and reflection different from the one of transmission and reflection; and
a controller that drives the first light source and the third light source to emit the first light and the third light simultaneously in a first period, drives the second light source and the fourth light source to emit the second light and the fourth light simultaneously in a second period following the first period, controls the first light modulator to perform modulation corresponding to the first light in the first period and modulation corresponding to the second light in the second period, and controls the second light modulator to perform modulation corresponding to the third light in the first period and modulation corresponding to the fourth light in the second period.

2. The projector according to claim 1,
wherein the first light is red light,
the second light and the third light are green light, and
the fourth light is blue light.

3. The projector according to claim 1,
wherein each of the first light source, the second light source, the third light source, and the fourth light source is a light emitting diode, and
the controller drives the first light source, the second light source, the third light source, and the fourth light source to emit light by supplying each of the first light source, the second light source, the third light source, and the fourth light source with a pulse voltage in the first period or the second period.

4. The projector according to claim 1,
wherein the first light modulator and the second light modulator modulate the first light, the second light, the third light, and the fourth light in such a way that an image formed by each of the first light, the second light, the third light, and the fourth light has a plurality of pixels arranged in a matrix, and
the first light modulator and the second light modulator are so disposed that the images formed by the first light and the second light modulated by the first light modulator and the images formed by the third light and the fourth light modulated by the second light modulator are combined with each other with the plurality of pixels contained in the images formed by the first light and the second light shifted from the plurality of pixels contained in the images formed by the third light and the fourth light in row and column directions by one-half the pitch between the pixels.

5. The projector according to claim 1,
wherein each of the first light modulator and the second light modulator is a liquid crystal device.

6. The projector according to claim 1,
wherein one of the first polarized light and the second polarized light is P-polarized light and the other is S-polarized light.

* * * * *